United States Patent Office 3,346,321
Patented Oct. 10, 1967

3,346,321
5-NITROTHIAZOLE-AZOPHENOL DYEING OF METALLIZED POLYOLEFIN ARTICLES AND PRODUCT THEREOF
Albin F. Turbak, Danville, Ill., assignor to Esso Research and Engineering Company, a corporation of Delaware
No Drawing. Original application May 20, 1963, Ser. No. 281,766. Divided and this application Oct. 6, 1964, Ser. No. 402,011
9 Claims. (Cl. 8—4)

ABSTRACT OF THE DISCLOSURE

The invention in this case is the dyeing of polyolefin articles, such as fibers, by applying an azo dye made from 5-nitro; 2-aminothiazole coupled to a phenol or naphthol thereto. The polyolefin fiber or article is metallized before spinning or shaping by incorporating a nickel, cobalt, chromium, manganese, iron, vanadium, copper or zinc salt into the polyolefin. The dye is thus applied to a metallized polyolefin article.

---

This invention relates to substituted azo compounds and their application in the art of dyeing. More particularly, it relates to the use of these compounds to dye polyolefin materials. This application is a division of S.N. 281,766, filed on May 20, 1963.

Poly alpha olefin materials have found increasing interest in the manufacture of formed plastic articles, and more recently as textile materials, because of their desirable properties of strength and low cost. One of the more difficult problems encountered, however, has been the poor dye acceptance of such products because of the inertness of a saturated hydrocarbon polymer. Although a poly alpha olefin material, such as polypropylene, can be dyed, its fastness to typical textile environments has been inadequate.

It has now been found that alpha olefin polymers into which have been incorporated 0.01 to 10 weight percent, preferably 0.05 to 2 weight percent of a nickel-containing compound may be successfully dyed when contacted with the azo compound of this invention. These dyes produce deep shades which are fast to washing and light, and are especially resistant to dry cleaning. The azo compounds of this invention may be represented by the formula

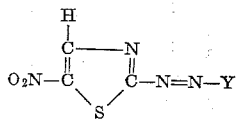

where Y represents the radical of a phenol which is broadly defined as an aromatic hydroxy compound. Preferably Y is derived from 3,4-xylenol or β-naphthol.

The azo compounds are formed by coupling diazotized 5-nitro-2-aminothiazole with an aromatic hydroxy compound. This is done by methods known in the art as, for example, by reacting a thiazole with nitrous acid followed by addition of the aromatic hydroxy compound.

Other phenols which may be used to produce the azo compounds of this invention include a dihydroxybenzene, a trihydroxybenzene, a dihydroxy toluene, a dihydroxybenzene monoalkyl ether, a dihydroxybenzene monobenzyl ether, a trihydroxybenzene monoalkyl ether, a trihydroxybenzene dialkyl ether, a dihydroxybenzene monoalkylacylate, a β-hydroxyethoxyphenol, a dimethyl phenol, a chlorocresol, a methoxy substituted alkyl phenol, a naphthol, methyl 3,5-dihydroxybenzoate, 2-nitroresorcinol and 2-chloro-3,5-dimethyl phenol, wherein the term alkyl as used above refers to an alkyl hydrocarbon group having 1 to 4 carbon atoms, and wherein the radical designated Y is devoid of substituents other than those indicated above.

Specific illustrative members of these classes are: catechol, resorcinol, 1,3,5-trihydroxybenzene, 1,2,3-trihydroxybenzene, orcinol (2,4-dihydroxy toluene), resorcinol monomethyl ether, resorcinol monoethyl ether, resorcinol mono-n-propyl ether, resorcinol mono-n-butyl ether, catechol monomethyl ether, catechol monoethyl ether, catechol mono-n-propyl ether, catechol mono-n-butyl ether, hydroquinone monomethyl ether, hydroquinone monoethyl ether, hydroquinone mono-n-propyl ether, hydroquinone mono-n-butyl ether, catechol monobenzyl ether, resorcinol monobenzyl ether, hydroquinone monobenzyl ether, 1,3,5-trihydroxybenzene monomethyl ether, 1,3,5-trihydroxybenzene monoethyl ether, 1,3,5-trihydroxybenzene mono-n-propyl ether, 1,3,5-trihydroxybenzene mono-n-butyl ether, 1,2,3-trihydroxybenzene monomethyl ether, 1,3,5-trihydroxybenzene dimethyl ether, 1,3,5-trihydroxybenzene diethyl ether, 1,3,5-trihydroxybenzene di-n-propyl ether, 1,3,5-trihydroxybenzene di-n-butyl ether, 1,2,3-trihydroxybenzene dimethyl ether, 1,2,3-trihydroxybenzene diethyl ether, 1,2,3-trihydroxybenzene di-n-propyl ether, 1,2,3-trihydroxybenzene di-n-butyl ether, resorcinol monoacetate, resorcinol mono-n-propionate, resorcinol mono-n-butyrate, hydroquinone monoacetate, hydroquinone mono-n-propionate, hydroquinone mono-n-butyrate, 3-β-hydroxyethoxyphenol, 4-β-hydroxyethoxyphenol, 2,4-dimethylphenol, 3,4-dimethylphenol, 2-chloro-4-methylphenol, 4-methoxy-2-methylphenol, 4-methoxy-2-ethylphenol, 4-methoxy-2-tertiarybutylphenol, 4-methoxy-3-methylphenol, 4-methoxy-3-ethylphenol, 4-methoxy-3-tertiarybutylphenol, methyl 3,5-dihydroxybenzoate, 2-nitroresorcinol and 2-chloro-3,5-dimethylphenol.

It is important that the 2-aminothiazole, which is coupled to the phenol, be substituted with $NO_2$ in the 5 position. Unsubstituted 2-aminothiazole can be diazotized and coupled with a phenol; however, when the resulting azo dye is contacted with a nickel containing alpha olefin polymer it produces a color which has substantially no resistance to dry cleaning fluid (perchloroethylene).

The polymers which are dyed by the compounds of this invention are hydrocarbon alpha olefin homopolymers and copolymers. The alpha olefin homopolymer can be prepared by any known process, such as the so-called Ziegler process, see for example Belgian Patent 533,362 and Belgian Patent 538,782. Examples of homopolymers within the scope of the invention include polyethylene, polypropylene, poly 1-butene, poly 1-heptene, and polyisobutylene. Polymers or copolymers of branched chain alpha olefins where the branching occurs no closer than the third carbon atom can also be employed such as poly 4,4-dimethyl-1-pentene, poly 4-methyl-1-pentene and poly 3-methyl-1-butene. In general, the homopolymers are prepared from alpha olefins having from 2 to 12 carbon atoms. The copolymers employed in the process of the invention include copolymers of two different alpha olefins such as ethylene-propylene copolymers, ethylene-1-hexene copolymers, and alpha olefin-aromatic olefin copolymers containing from 1 to 15% by weight of an aromatic olefin, such as for example copolymers of styrene with 4-methyl-1-pentene. Also, blends of one or more of the previously mentioned polymers can be employed. The polymers and copolymers employed in the invention have molecular weights ranging from 100,000 to 1,000,000. The preferred polymers and copolymers of the invention are those prepared by the use of alkyl metal catalysts. Most preferred is polypropylene. Catalysts which are useful in this process are mixtures of reducible heavy transition metal compounds and reducing metal containing substances, or mixtures of partially reduced heavy transition metal compounds and organometallic activators. Examples of these catalysts are TiCl₄+AlEt₃ and TiCl₃+AlEt₃. The catalysts used for preparing the preferred polymers employed in the instant process are those catalysts given on page 6, line 20, to page 10, line 21 of copending application Ser. No. 831,210, filed Aug. 3, 1959.

While the compounds of this invention are principally useful for dyeing fibers or filaments, they may also be used to dye polyolefin films, foils, and other similarly formed objects.

The metal which is incorporated into the polyolefin is preferably nickel although other metals may be suitable such as cobalt, chromium, manganese, iron, vanadium, copper or zinc. Any compound of these metals may be used although the method of blending will vary as the properties of the metal compound differ. Thus for example a metal compound which is miscible with the polyolefin may be added directly to the melt. Alternatively pellets of the polymer may be ground with a powdered metal compound and a melt prepared from this blend.

Inorganic salts such as the halides and sulfates may be used; however, it is preferred to use organic compounds such as nickel acetate, nickel acetyl acetonate and nickel 4-methoxy, 2-hydroxybenzophenone. Copending S. N. 255,668, filed January 22, 1963, lists some of the metal compounds which are suitable. Most preferred is nickel 4-methoxy, 2-hydroxybenzophenone.

This invention will be more fully understood by reference to the following examples.

EXAMPLE 1

A solution of 3.9 g. of sodium nitrite in 47 grams of concentrated (96%) sulfuric acid was prepared by slowly adding the sodium nitrite in small portions to the acid at 5°–10° C. with stirring. To this solution was added at 10° C., 50 cc. of 1:5 propionic-acetic acid mixture. Then a solution of 5.05 g. of 2-aminothiazole dissolved in 50 cc. of 1:5 propionic-acetic acid mixture was added at 0°–5° C. and the resulting mass was stirred for 2 hours at 5° C. and was filtered cold through a frittered glass funnel.

The filtrate was added at 5° C. to a solution of 6.1 g. of 3,4-xylenol in 150 cc. of 1:5 propionic-acetic acid mixture. The reaction was allowed to come to room temperature and stirred at 25° C. for 2 hours. Then 235 g. of ammonium acetate was added in portions while the temperature was maintained at 25° to 30° C. The neutralized mass was then dumped into 2 liters of ice water. The precipitate which formed was filtered, washed with water until the filtrate was free from acid, and was then dried in a vacuum oven at 55° C. overnight to give 4.8 g. of red-brown solid.

EXAMPLE 2

The red-brown powder from Example 1 was ground and some of the fine grind product (0.1 g.) was dispersed by pasting with 1 cc. of Igepal, a long chain alkyl phenol ethylene oxide condensate, dispersant. The paste was then diluted with water and heated to boiling. A sample of polypropylene fiber melt spun from a polymer having an intrinsic viscosity of 1.5 (in decalin at 120° C.) containing 0.05% nickel as the 4-methoxy-2-hydroxy benzophenone complex was added to the hot dye solution and was dyed to a deep green color from the red-brown dye dispersion.

This green sample was divided in half and one portion was tested for fastness to perchloroethylene. The fabric bled immediately on immersion in cold perchloroethylene and after 10 minutes all of the green color had been removed from the fiber.

The portion of fabric which was not dry cleaned was placed in the Fadeometer and lasted less than 50 hours before showing a break in shade.

EXAMPLE 3

Example 1 was repeated using 5.05 g. of 2-aminothiazole and 7.2 grams of β-naphthol in place of the 6.1 g. of 3,4-xylenol. This gave a yield of 9.6 grams of an orange colored product. When 0.1 g. of this powder was dispersed with 1 cc. of Igepal dispersant and used to dye nickel-containing polypropylene from a hot aqueous dispersion, the polypropylene was dyed to a deep brownish-maroon shade.

This fabric was divided into 2 portions. One portion was treated with cold perchloroethylene and all of the color was removed after 15 minutes. The other half was placed in a Fadeometer and lasted 93 hours before showing a break in color.

EXAMPLE 4

Example 1 was repeated using 7.35 grams of 5-nitro-2-aminothiazole in place of the unsubstituted 2-aminothiazole and using 6.1 g. of 3,4-xylenol. There was obtained 10.5 g. of a red-brown product. When this product was dispersed in Igepal and water and used for dyeing nickel-containing polypropylene as in Example 2, the fibers were dyed to a very deep dark green color. This dyed fabric was resistant to the action of both cold perchloroethylene for 15 minutes and to warm perchloroethylene at 40° C. for 30 minutes.

Thus, in contrast to the unsubstituted thiazole dyes, the 5-nitrothiazole dye has excellent dry cleaning fastness. These samples lasted 56 hours in the Fadeometer before showing a break in color.

EXAMPLE 5

Example 1 was repeated using 7.35 grams of 5-nitro-2-aminothiazole in place of the 5.05 g. of unsubstituted 2-aminothiazole and 7.2 g. of β-naphthol in place of the 6.1 g. of 3,4-xylenol. There was obtained 11.65 of red-orange solid product.

When this dye was dispersed and applied to nickel-containing polypropylene as in Example 2, the polypropylene was dyed to a very deep navy blue shade. This dyed fabric was fast to warm perchloroethylene for 30 minutes at 40° C. Again, the 5-nitro substituted product displayed good dry cleaning fastness. These samples were placed in the Fadeometer and lasted longer than 240 hours without showing any break in shade.

This invention has been described in connection with certain specific embodiments thereof; however, it should be understood that these are by way of example rather than by way of limitation, and it is not intended that the invention be restricted thereby.

What is claimed is:
1. A process for dyeing a polymeric article formed of an alpha olefin polymer:
   (a) containing .01 to 10 weight percent of a metal compound, said metal being selected from the group consisting of nickel, cobalt, chromium, manganese, iron, vanadium, copper and zinc,
which comprises contacting the formed polymer with a monoazo dye having the formula

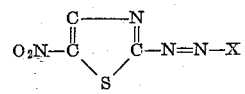

where X is the radical of a phenol.
2. The process of claim 1 wherein the metal compound is a nickel compound.
3. The process of claim 2 wherein .05 to 2 weight percent of a nickel organic compound is incorporated in the polymer.
4. The process of claim 3 wherein X is 3,4-xylenol.
5. The process of claim 4 wherein X is β-naphthol.
6. The process of claim 3 wherein the polymer is formed into fibers.

7. The process of claim 4 wherein the polymer is formed into fibers.

8. The process of claim 6 wherein the polymer is polypropylene.

9. The process of claim 7 wherein the polymer is polypropylene.

References Cited

UNITED STATES PATENTS 2,984,634  5/1961  Caldwell et al. _____ 260—23

DONALD LEVY, *Examiner.*